Patented Jan. 14, 1947

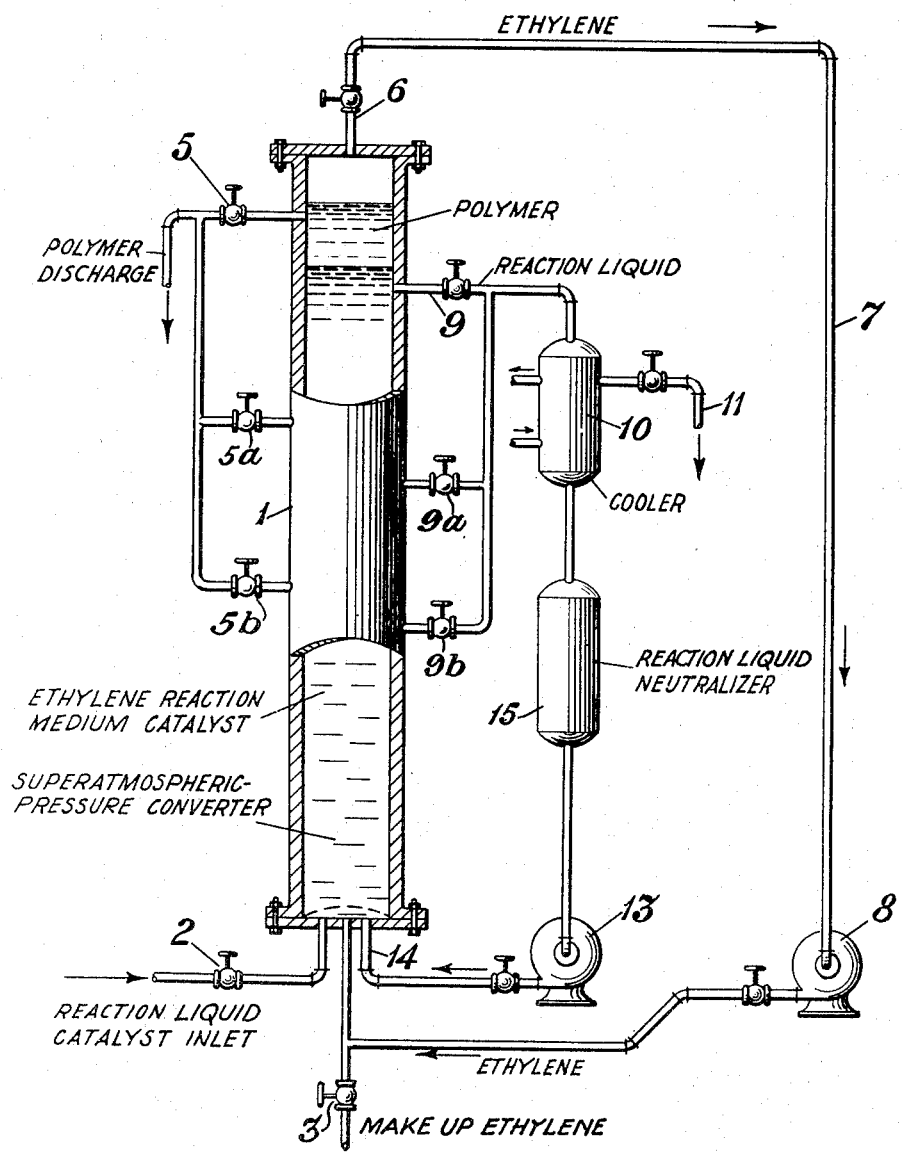

2,414,311

UNITED STATES PATENT OFFICE 2,414,311

PREPARATION OF POLYMERS OF ETHYLENE

Alfred Theodore Larson, Wilmington, Del., assignor to E. I. du Pont de Nemours & Company, Wilmington, Del., a corporation of Delaware Application July 30, 1943, Serial No. 496,821

2 Claims. (Cl. 260—94)

This invention relates to an improved process for the preparation of high molecular weight products from hydrocarbons containing a single ethylenic linkage and is more particularly related to an improved process for the interpolymerization of ethylene with other unsaturated compounds to products of high molecular weight.

Various methods have been proposed for the polymerization of olefines such as ethylene, with or without unsaturated organic compounds, with the principal object of obtaining high molecular weight products for various purposes. Oil-like products of relatively low molecular weight have been prepared by polymerization in the presence of boron-fluoride and similar type catalysts, while solid to semi-solid high molecular weight products of a polymeric nature have been obtained by effecting the polymerization or interpolymerization in the presence of peroxygen-type catalysts by treatment under elevated temperature and at pressures above 50 atmospheres and up to 3,000 atmospheres or more. The invention of the instant case is principally directed toward reactions and products of the latter type.

An object of the present invention is to provide an improved method for the polymerization of hydrocarbons and interpolymerization of mixtures of hydrocarbons containing ethylenic linkages. Another object is to provide a process for the preparation of such high molecular weight products catalyzed by peroxygen-type catalysts wherein the course of the reaction is accurately controlled under liquid phase conditions. A further object of the invention is to provide a suitable reaction converter wherein ethylene can be polymerized or interpolymerized in the presence of peroxygen-type catalysts and from which the products can be readily removed. A further object is to provide a reaction zone for such reactions within which efficient contact of the catalyst with the reactants is provided. Other objects and advantages of the invention will hereinafter appear.

The reaction of olefinic hydrocarbons containing a single ethylenic linkage and more especially the polymerization of ethylene with other unsaturated hydrocarbons is effected in accord with the prior art by heating to temperatures between 60 and 400° C. under pressures above 50 atmospheres and preferably between 800 to 1500 atmospheres although much higher pressures may be used. These reactions, as has been indicated, are conducted in the presence of peroxygen-type catalysts more fully particularized hereinafter and with the highly reactive catalysts such as oxygen, benzoyl peroxide, diethyl peroxide and the like. When the reaction is conducted at temperatures as low as 40° C. and at pressures as low as 50 atmospheres, the olefine is usually reacted with polymerizable organic compounds in the presence of highly active catalysts such as the peroxides, while at extremely high pressures say above 3000 atmospheres, the polymerization of ethylene proceeds without the aid of catalysts and at moderate temperatures.

It is well known that the polymerization of ethylene as well as its interpolymerization or copolymerization with other unsaturated compounds takes place with the evolution of considerable heat. It is also well known that the temperature must be held within very narrow limits in order to produce a polymer having the desired properties. When interpolymers and copolymers are to be formed the problem is further complicated by the necessity of maintaining a constant ratio of reactants. This is especially difficult in those cases in which one of the constituents is largely in the liquid phase. This is illustrated by the preparation of an interpolymer of ethylene and vinyl acetate. Unless the ratio of reactants to one another be adequately controlled a product having uniform properties will not consistently be produced. Various devices have been suggested for accomplishing this control as, for example, the emulsification of the gaseous and liquid hydrocarbon in an aqueous or other non-solvent medium. Such methods require the use of so-called emulsifying agents which complicate the process and in some cases adversely affect the properties of the resulting product.

In my study of polymers, especially those involving ethylene, I have found that the length of time the reactants are held in the zone of reaction is important. Ethylene polymerization takes place as has been stated, at elevated temperatures and pressures where undesirable changes take place slowly, making the prompt removal of the polymer, interpolymer, or copolymer from the reaction zone important.

In accord with this invention the control of temperature, control of pressure, control of time of contact, control of intimate association of the reactants especially when interpolymers and copolymers are prepared, whereby the physical and chemical properties of the product can be held within narrow limits, are accomplished by my process which will be more fully particularized hereinafter.

The invention can be better understood by reference to the single diagrammatic sketch illustrating a vertically disposed cylindrical converter wherein the reaction may be conducted. The converter 1 is a thick-walled vessel capable of withstanding superatmospheric pressures and into this converter through inlet 2 a liquid reactant is introduced, such, for example, as vinyl acetate, vinyl chloride, vinyl chloracetate, butadiene, methyl methacrylate or the like, which is to be reacted or interpolymerized with the ethylene. The apparatus is also adaptable to the preparation of products other than interpolymers and if such are to be prepared, a liquid medium such as water, tertiary butanol, methanol, benzene, chlorbenzene, or other suitable liquid is introduced through inlet 2, the reactant or reaction medium being preferably charged prior to use with a suitable amount of a peroxygen-type catalyst. Other methods of introducing the catalyst may be used, however, such as injecting it directly into the converter 1, mixing it with a mutual solvent, i. e., a solvent for the reactant or the reaction medium and for the catalyst, and then introducing the mixture, or any other suitable method may be employed.

In accord with one feature of the invention, accurate control of the course of the reaction is made possible by the height of the reactant or reaction medium within converter 1. The amount, therefore, of the reactant or reaction medium introduced prior to the reaction into the converter will be governed by the type of reaction product and other considerations which will be more fully described hereinafter. Moreover, throughout the reaction the valve 2 will be so regulated when operating under these conditions that the level of the reactant or reaction medium is maintained at substantially the desired level within the converter 1.

When the converter, for example, is charged with water containing oxygen, ethylene is introduced through inlet 3 and the pressure within the converter built up to the desired pressure for the reaction, say between approximately 800 and 1500 atmospheres by, for example, ethylene pressure. Heat is applied by electrical or other suitable means not shown to start the reaction and as the reaction proceeds the high molecular weight polymers rise to the top of the converter and are removed through outlet 5, 5a or 5b, positioned at suitable intervals governed by the height of liquid desired in the converter, each outlet being provided with a suitable pressure let-down valve to lower the pressure of the discharged products. The unconverted ethylene together with some vaporized reaction medium and possibly some dissolved products of the reaction are withdrawn from the top of the converter through gas exit 6 and returned by means of the outside circuit 7 by pump 8 into converter 1. It will be noted that there is no let-down valve provided in the gas circuit 7 although a pressure let-down and cooling means may be added to this circuit, if desired, under which circumstances pump 8 must be of greater capacity for it will have, in addition to the load required for recycling, the load required to bring the ethylene back to reaction pressures. Intimate contact between the catalyst and ethylene or other reactants is advantageous and this may be aided by a liquid circuit through which the reaction medium together with a small amount of product and dissolved ethylene are withdrawn from the converter 1 through the liquid exit 9.

The liquid circuit exits 9, 9a or 9b are placed as shown below the level at which the products accumulate under the conditions used. The reaction medium is passed through a cooler 10, from which accumulated product passing over with the reaction medium may be separated, then passed into neutralizer 15 wherein any acids present may be neutralized to approximately litmus neutrality by means of ammonia or other suitable alkaline addition agent; it is then returned by means of pump 13 through inlet 14 back into the converter. In the liquid circuit the cooler 10 may be employed if desired to dissipate a major portion of the heat of the reaction; from the cooler 10 separated products may be discharged through pipe 11.

While the converter is described for use with an external liquid circuit wherein the reaction medium may be cooled other means may be employed for withdrawing the large amount of exothermic heat from the reaction zone. This may be done by the use of cooling coils provided within the converter, by the heat of evaporation of the reaction mixture or by any other suitable means.

By the introduction of the reaction medium separately from the introduction of the olefine, or of other reactant or reactant mixtures to be polymerized, the amounts of each introduced into the converter can be independently adjusted. Operation and reaction control are facilitated by the use of vertically disposed converters in the order of two or more inches in internal diameter. In such converters the upward flow of the ethylene, in a non-solvent liquid medium, is substantially directly proportional to the difference in density between the ethylene and the liquid medium.

One of the preferred embodiments of the invention involves, as has been indicated, conducting the reaction in such a way that the olefine and especially ethylene is introduced into a liquid medium containing the catalyst. This liquid medium may be a mere reaction medium which has been heretofore described or may be an unsaturated compound with which the ethylene is to be interpolymerized or a mixture of both. Conditions are used which will insure that the liquid medium is in the liquid phase and consequently for this feature of the invention temperatures should be maintained below critical temperatures, i. e., below approximately 150° C. When so conducted, excellent control of the nature of the product formed, particularly between ethylene and other liquid unsaturated compounds, is achieved when the reaction is conducted in a high pressure converter such as that described.

These converters are constructed of sufficiently large diameter to permit the free and unobstructed up-flow of the compressed ethylene through the liquid medium. In those instances in which the ethylene is relatively insoluble in the liquid medium the time of contact of the ethylene with the liquid can be held within close limits by control of the temperature, the pressure and the height of the liquid column. In those cases where the temperature and pressure are prescribed by the nature of the reaction involved, the time of contact of the compressed ethylene within the liquid phase is readily controlled by fixing the height of the liquid column through which the compressed ethylene is ascending.

In many instances, particularly in the preparation of interpolymers between ethylene and unsaturated compounds, and under those circumstances in which the unsaturated compound is employed under suitable temperature conditions as the liquid medium, the absorption of the ethylene in the unsaturated compound may likewise be a factor which must be given due consideration. Where the solubility effect is great the time of contact cannot be predicated solely on the depth of the liquid medium for under such circumstances it has been found advisable to provide another means of control. This supplementary method of control, applicable when solubility effects are present, is made available by regulating the flow of the liquid medium through the converter and thereby the contact time of the reactants while under the reaction conditions. The converter described herewith is particularly well adapted for operating under these conditions for it permits accurate control of contact time by means of the rate of flow of the liquid medium through the converter and likewise the length of path travelled by the liquid medium within the converter.

The liquid in the converter may or may not enter into the reaction itself for as has been stated it may be water in which instance it acts as a medium within which the polymerization is conducted. On the other hand, it may be a saturated organic compound such as methyl propionate, 1,3-dioxolane, carbon tetrachloride, or the aliphatic alcohols such as methanol, ethanol and higher alcohols, for example, a portion of such a liquid will react with the olefine such as ethylene to give a modified polymeric compound. Furthermore, the liquid in the converter may be a mixture of substances such as water and methanol, water and methyl propionate, or other mixture.

The invention, as has been stated, covers the polymerization of ethylene alone as well as its interpolymerization with a variety of unsaturated compounds such as propylene, isobutylene, styrene, and similar monoolefinic hydrocarbons, vinyl esters, such as vinyl acetate, vinyl formate, and vinyl isobutyrates, as well as such acids as acrylic, methacrylic, itaconic, crotonic, and fumaric as well as their derivatives such as esters, acid halides, amides, and anhydrides. Ethylene will form valuable interpolymers with the vinyl compounds such as vinyl chloride and vinylidene chloride; vinyl cyanide and N-vinyl amides, vinyl ethers, divinyl formal, divinyl butyral and methyl vinyl ketone, and will likewise form high molecular weight products in the presence of and with a number of compounds such, for example, as the halogenated aliphatic hydrocarbons, the saturated aliphatic and aromatic, acids, esters, anhydrides, aldehydes, alcohols, and ethers. In many instances, these addition agents may be present as the liquid medium used or they may be introduced with the ethylene into a non-reacting liquid medium such as water or water and benzene and the like.

The reaction may be conducted by the use of molecular oxygen as the catalyst but materials which yield oxygen under the conditions of the reaction may be used if desired together with or in place of free oxygen. Thus, for example, free oxygen may be employed alone or it may be wholly or partially replaced by such materials as peroxygen-type catalysts, by which term is meant oxygen itself or catalysts which are either formed by hydrogen peroxide on ordinary acids or else give rise to hydrogen peroxide on treatment with dilute sulfuric acid. Examples of such compounds are benzoyl peroxide, persuccinic acid, lauroyl peroxide, tetralin peroxide, urea peroxide, diethyl peroxide, butyryl peroxide, acetyl peroxide, acetyl benzoyl peroxide, peracetic acid, alkali metal persulfates, perborates, percarbonates, and the like.

The ethylene employed for the reaction should be free from large amounts of oxygen. Oxygen, however, may be added prior to the reaction to pure ethylene in order to give from 5 to approximately 500 parts of oxygen per million parts of ethylene, ethylene freed from oxygen to that extent or oxygen added to oxygen-free ethylene during the reaction may be the source of ethylene for the reaction. If oxygen is to be used solely as the catalyst from 30 to 50 p. p. m. is usually sufficient and if other peroxygen-type catalysts are employed, ethylene can be used containing smaller amounts of oxygen.

Operation of the converter in accord with the many features hereinbefore described provides continuous processes which produce polymers and interpolymers having properties that are held within extremely narrow limits.

I claim:

1. In a process for the preparation of high molecular weight polymers of ethylene at a pressure between 50 and 3000 atmospheres and a temperature between 60 and 400° C., the steps which comprise passing ethylene upwardly through a reaction zone of sufficiently large diameter to permit the free and unobstructed up-flow of ethylene through a large volume of water containing a catalyst selected from the group consisting of oxygen and peroxy catalysts, and to permit the free up-flow of water substantially unaccelerated by the up-flow of ethylene, collecting the polymer as an upper layer, providing a vapor space above the water and the polymer layer, discharging the unreacted ethylene from above the polymer layer, discharging the water from below the polymer layer, and regulating the reaction by the flow of water and ethylene through the reaction zone.

2. In a process for the preparation of high molecular weight polymers of ethylene at a pressure between 50 and 300 atmospheres and a temperature between 60 and 400° C., the steps which comprise passing ethylene upwardly through a reaction zone of sufficiently large diameter to permit the free and unobstructed up-flow of ethylene through a large volume of water containing a catalyst selected from the group consisting of oxygen and peroxy catalysts, and to permit the free up-flow of water substantially unaccelerated by the up-flow of ethylene, the reaction time being regulated by the rate of flow of the water through the reaction zone and regulating that rate of flow by withdrawing the water from the reaction zone at a point opposite its introduction, neutralizing the water withdrawn and reintroducing it into the reaction zone.

ALFRED THEODORE LARSON.

Certificate of Correction

Patent No. 2,414,311. January 14, 1947.

ALFRED THEODORE LARSON

It is hereby certified that error appears in the printed specification of the above numbered patent requiring correction as follows: Column 6, line 52, claim 2, for "300" read *3000*; and that the said Letters Patent should be read with this correction therein that the same may conform to the record of the case in the Patent Office.

Signed and sealed this 25th day of March, A. D. 1947.

[SEAL]

LESLIE FRAZER,
*First Assistant Commissioner of Patents.*